UNITED STATES PATENT OFFICE.

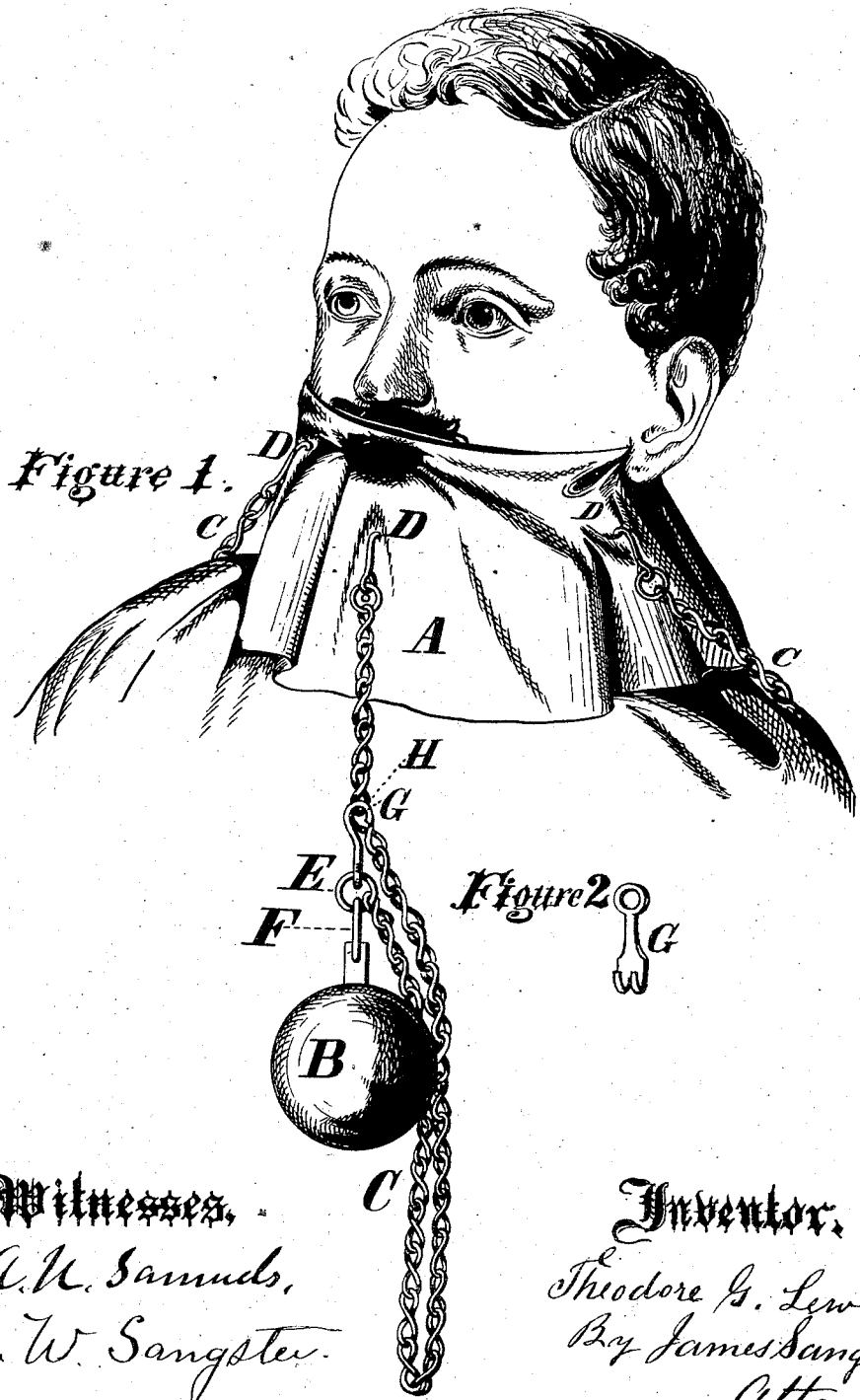

THEODORE G. LEWIS, OF BUFFALO, NEW YORK, ASSIGNOR TO THE BUFFALO DENTAL MANUFACTURING COMPANY, OF SAME PLACE.

IMPROVEMENT IN RUBBER-DAM TENSION-WEIGHTS.

Specification forming part of Letters Patent No. 160,604, dated March 9, 1875; application filed November 18, 1874.

*To all whom it may concern:*

Be it known that I, THEODORE G. LEWIS, of Buffalo, in the county of Erie and State of New York, have invented a new and useful Rubber-Dam Tension-Weight, of which the following is a specification:

This invention is for the purpose of keeping a loose corner or projecting fold of rubber dam out of the way of the operator while filling teeth, and is capable of producing the tension required for that purpose in almost any direction. It consists in the combination of a rubber dam with a weight provided with a chain and pointed hook for readily connecting it or disconnecting it therefrom, and a hook by which the length of the chain may be lengthened or shortened.

In the accompanying drawings, Figure 1 represents a piece of rubber dam, showing my invention connected therewith as it appears when put on ready for operating on a tooth. Fig. 2 is a perspective view of the hook for regulating the length of the chain.

A in said drawings represents the rubber dam; B, the weight; C, the chain, which is made long enough to admit of the weight being thrown over the back of the chair, or in any direction required. It is provided with a hook at one end, D, for attaching it to the rubber dam, as shown. The opposite end is attached to the weight B by means of the rings E F. A second hook, G, is attached to the weight by means of the ring E, for the purpose of regulating the length of or shortening the chain by catching it therein at any point desired, as shown at H.

The weight may be made either flat, oval, or any other shape, but the spherical form is best. It is easier made and costs less. The length of the chain admits of its being thrown over the shoulder, as shown in the drawing, or to one side, or in almost any other direction.

I prefer to use the weight, chain, and hook combined, as described; but a clamp, spring, or other equivalent for the purpose may be used instead without a chain, but, as will be readily seen, it would not answer the purpose as well.

The rubber dam and its uses, being long and favorably known to those skilled in the art to which it appertains, require no further description here, the object of my invention being to combine therewith a simple and convenient means for keeping the loose corners or projecting folds of rubber dam out of the way while operating on the teeth.

I claim—

In combination with a rubber dam, the weight B, hook G, chain C, and pointed hook D, all as and for the purposes described.

THEO. G. LEWIS.

Witnesses:
R. W. ENGLISH,
JAMES SANGSTER.